3,227,561
COLORING AGENT CONTAINING CAROTENOID PIGMENT, AND PREPARATION OF SUCH AGENT
Hiroyuki Mima, Nishinomiya, Mamoru Terasaki, Itami, and Mitsuo Kato, Osaka, Japan, assignors to Takeda Chemical Industries, Ltd., Higashi-ku, Osaka, Japan
No Drawing. Filed Feb. 12, 1963, Ser. No. 257,847
12 Claims. (Cl. 99—148)

This application is a continuation-in-part of copending application, Serial No. 191,299, filed April 30, 1962 (now abandoned).

The present invention relates to a carotenoid pigment containing coloring agent for foodstuffs, beverages, pharmaceuticals, cosmetics, etc. and to a method for preparing such coloring agent.

More specifically, the invention relates to a stable and safely utilizable coloring agent containing one or more carotenoids, which agent may be prepared—briefly stated —by dissolving one or more carotenoids in abietic acid or hydrogenated abietic acid or a derivative thereof, the carotenoid(s) being selected in accordance with the object in view, and then, if desired, incorporating an essential oil and/or a dispersing agent into the solution in order to emulsify the same. (Hereinafter, abietic acid, hydrogenated abietic acid and a lower aliphatic acid ester thereof are referred to as abietic acids.)

For imparting an orange or yellow coloration to foodstuffs, beverages, pharmaceuticals, cosmetics, etc., use has heretofore been made of coloring agents such as "Orange I," "Orange SS," "Yellow AB," "Sunset Yellow FCF," most of which are azo-compounds. These known orange- or yellow-coloring agents are not always harmless to living bodies, and therefore the pharmacological problem entailed in the use thereof has been a long-existing and much-explored problem.

Absent a satisfactory solution of the problem, foodstuffs, pharmaceuticals, cosmetics, etc. have in recent years been colored with carotenoid pigments which have no toxicity or are harmless to living bodies. Carotenoid pigments are, however, in most cases essentially insoluble in solvents such as water, ethanol, etc., and it is very disadvantageous in the practical use of such pigments.

For example, $\beta$-carotene is soluble at 30° C. in corn oil or cotton seed oil to an extent of 0.08% at best (all percentages are in weight-by-weight percent throughout this specification except when otherwise stated, or in olive oil to an extent of 0.1%. Therefore, the procedure to be employed in dissolving carotenoid pigments in a higher concentration assumes an important role in their use as coloring agents for foodstuffs, pharmaceuticals, cosmetics, etc.

The method heretofore employed is that $\beta$-carotene is dissolved in a vegetable oil at about 140° C., an aqueous colloid containing gelatin and sugar is added to the solution to disperse the $\beta$-carotene in the water and the suspension is spray-dried, and then the thus-obtained suspension or spray-dried material is incorporated into the material to be colored. However, even when $\beta$-carotene is thus dissolved in a vegetable oil at about 140° C., it (the $\beta$-carotene) gradually separates out with lowering of the temperature of the solution, so that only 1% of $\beta$-carotene is dissolved when the solution is allowed to stand for 8 hours at room temperature (about 20–30° C.). The solubility of the $\beta$-carotene is still further decreased with lapse of time to cause separation of a large quantity of crystals and creaming of the solution.

As described above, the known methods require the use of a large quantity of vegetable oil for dissolving $\beta$-carotene which has low solubility in such oil, when the $\beta$-carotene is to be added to foodstuffs, pharmaceuticals, etc. However, the use of a large quantity of vegetable oil enegenders not only difficulty of emulsification, but also an unpleasant taste and odor of the colored material. Therefore these known methods can hardly be regarded as suitable for coloring such material. Briefly stated, the desideratum specified in the preceding paragraph is realized by the novel expedient, according to this invention, of employing abietic acid or hydrogenated abietic acid or a lower aliphatic alcohol ester thereof as a solvent for the carotenoid pigment used as a colorant. The abietic acid or hydrogenated abietic acid or a lower aliphatic alcohol ester thereof which is thus critical to and characteristic of the present invention possesses special properties which adapt them particularly to the object here in view.

The carotenoid can be dissolved in abietic acids in relatively high concentration and the solution is stable and even after the solution has been kept for a long time, the relatively high concentration is retained. Further abietic acids have no substantial toxicity and no unpleasant odor or taste. The specific gravity of abietic acids being approximately equal to that of fruit juice, it is slightly heavier than water.

The present inventors finding this peculiar property of abietic acids have taken advantage thereof for producing a stable and safe utilizable water-dispersible coloring agent comprising carotenoid pigment as a colorant and being useful for coloring the various edible and other materials hereinbefore enumerated such as foodstuffs, beverages, pharmaceuticals, cosmetics, etc.

The invention thus makes possible the realization of the following goals:

(a) The preparation of a coloring agent in the form of a relatively highly concentrated solution of carotenoid in abietic acids which agent is readily water-dispersible;

(b) The preparation of edible products enriched in carotenoids by the incorporation into such products of a relatively highly concentrated solution of carotenoid in abietic acids.

(c) The preparation of a safe and stable carotenoid-containing coloring agent, free from unpleasant taste or odor due to vegetable oil.

As described above, these goals are readily achieved by dissolving one or more carotenoids in abietic acids and when necessary and/or desirable, by incorporating a dispersing agent or an essential oil.

The basic procedure according to the invention is to dissolve the carotenoid pigment in abietic acids under heating to about relatively low temperature. Preferably the pigment may be dissolved by heating within 60 minutes at 90° C. to 140° C., most preferably at about 98° C. to 100° C. for about 30 to 60 minutes.

The solubility of carotenoid in abietic acids solution thus obtained decreases very slowly when it is cooled to room temperature, but still the concentration of carotenoid remains at more than 3% even after the solution is preserved at room temperature for several months.

The reason is, by the inventors' consideration, ascribable to the fact that a part of trans-carotenoid is converted into cis-carotenoid by heating, with the result of forming a mixture of cis- and trans-carotenoid, which is of a higher solubility, as well as of a more stable supersaturated solution. More than 3% of carotenoid being contained in the solution even after several months, the solution is very convenient for practical use.

Alternatively the so-obtained relatively concentrated solution of the carotenoid may be admixed with a dispersing agent such as a surface active agent or an essential oil, and the resultant dispersion or emulsion is incorporated into the material to be colored.

The effectively supersaturated solution of carotenoid pigment can likewise be emulsified prior to its incorporation into the material to be colored.

The so-obtained solution of carotenoid in abietic acids has the specific gravity slightly heavier than water, the specific gravity of the solution being approximately equal to that of fruit juice. Therefore, the solution of carotenoid in abietic acids can be preserved without being separated for a long time. When there is a wide difference in the specific gravity between the solution of carotenoid in abietic acids and substances to be colored, it is preferable that the specific gravity of the solution and the substances is made close by adding a non-toxic gravity controlling agent having no unpleasant odor and not discoloring the carotenoid contained. As this agent, there may, for example, be an essential oil, which is added to the abietic acids solution so as to make it specific gravity, most preferably, be close to 1.0 or less.

As a lower aliphatic alcohol ester of abietic acid or hydrogenated abietic acid, there may, for example, be abietic acid methyl ester, dihydroabietic acid methyl ester, abietic acid ethyl ester, tetrahydroabietic acid ethyl ester, abietic acid propyl ester, dihydroabietic acid propyl ester, tetrahydroabietic acid propyl ester, etc., whose aliphatic alcohol has one or more substituents such as hydroxyl group. Among them, dihydroabietic acid ethyl ester is most preferable.

The carotenoids which are used in accordance with the invention are selected from among the natural and synthetic carotenoids. Preferred carotenoids are $\alpha$-carotene, $\beta$-carotene, $\gamma$-carotene, lycopene, cryptoxanthin, xanthophyll and the like.

As an essential oil employed for the purpose of controlling a specific gravity, there may be so-called perfume-oils such as orange oil, lemon oil, rose oil, and a terpene containing oil such as curcuma oil or a brominated vegetable oil.

In order to protect the carotenoid or abietic acids or an essential oil, etc., against oxidation and degeneration, an antioxidant may optionally be added to the solution. As the antioxidant, there may be used, for example, oil soluble antioxidants such as butylated hydroxyanisole, butylated hydroxytoluene hereinafter abbreviated as BHA and BHT etc., or water-soluble anti-oxidant such as ascorbic acid or the salt thereof.

The solution in abietic acids of one or more carotenoids according to this invention may be directly emulsified in water, or it may be suspended or emulsified in water after adding a dispersing agent such as a surface active agent, for example, glycerin monostearate, fatty acid esters of sorbitan, sucrose or raffinose, sodium salts of fatty acids and polyoxyethylene glycol derivatives, etc., a protective colloid such for example as polyvinylpyrrolidone, gum tragacanth, gum arabic, gelatin, agar agar, carboxymethylcellulose, etc., or a specific gravity controlling agent such for example as brominated vegetable oil, etc. The dispersing agent is added in an amount of about 1 to 20% by volume relative to the essential oil, but it may be employed in a volume of over 20 times that of the said oil. Generally speaking, these supplemental materials may be used in optimal amount, subject only to the condition that such amount is not prejudicial to the consumer of the product. To prepare such an emulsion or solution, a conventional method such as agitation, colloid-mill, homogenizer, etc. is employed.

A suspension or other product prepared in accordance with the present invention is very stable. Where the carotenoid is employed as a colorant in the form of such a preparation as above, it is essentially uninfluenced by light, temperature, pH, salts, etc. Separation of crystals or creaming does not occur in such suspensions.

In addition, it becomes possible to obtain a carotenoid-containing coloring agent having no unpleasant odor or taste.

The carotenoids present in the described state, as solution, emulsion or powder (obtainable e.g. by spray-drying the dispersion or emulsion), are useful for making food products (including animal feeds and the like) enriched with the carotenoids—as precursor of vitamin A—simultaneously with imparting color to such products. They are also useful as additaments for beverages, medicines, costmetics, etc.

In addition, and essentially as hereinbefore-described, this invention makes it possible to colorize aqueous base food products such as fruit and vegetable juices, soft drinks, milk, ice cream, sherbet, etc., cosmetics such as lotions, cosmetic creams, milk lotions, as well as pharmaceuticals, animal feeds and veterinary drugs by dispersing a preparation of this invention in the aqueous base, without fear of crystallization or settling of the carotenoid pigment.

The following examples represent presently preferred illustrative embodiments of the invention. Parts are by weight unless otherwise indicated. The relationship between parts by weight and parts by volume is the same as that between grams and milliliters. Percentages are by weight. Temperatures are in degrees centigrade.

*Example 1*

With 50 parts by weight of dihydroabietic acid ethyl ester are mixed 1 part by weight of $\beta$-carotene, 0.1 part by weight of BHT and 0.01 part by weight of BHA, while heating at about 100° C. for 30 minutes. After cooling, the resultant mixture is mixed with an aqueous solution containing 10 parts by weight of gum arabic and 5 parts by weight of sodium ascorbate in 2000 parts by volume of water. The entire resultant solution is emulsified in an homogenizer to obtain a stable emulsion of $\beta$-carotene.

*Example 2*

To 50 parts by weight of dihydroabietic acid admixed with 1 part by weight of $\beta$-carotene, are added 0.1 part by weight of BHT and 0.01 part by weight of BHA, while heating at about 100° C. for about 30 minutes. After cooling, the mixture is added to a solution containing 10 parts by weight of gum arabic and 10 parts by weight of ascorbic acid in 2000 parts by volume of water.

Thereupon, the resultant solution is emulsified in an homogenizer to obtain a very stable emulsion of $\beta$-carotene.

*Example 3*

With a mixture containing 40 parts by weight of dihydroabietic acid glyceride and 10 parts by weight of orange oil, are admixed 1 part by weight of $\beta$-carotene, 0.1 part by weight of BHT and 0.01 part by weight of BHA, while heating at about 100° C. for about 30 minutes.

Thereupon, the resultant solution is mixed with an aqueous solution of 10 parts by weight of sodium ascorbate in 2000 parts by volume of water, followed by 5 parts by weight of Tween 80. The entire mixture is emulsified in an homogenizer, whereby a stable emulsion of $\beta$-carotene is obtained.

*Example 4*

A stable orange juice containing no artificial pigment is prepared by incorporating 300 parts by volume of $\beta$-carotene emulsion prepared by Example 1 into 1000 parts by volume of ⅕ concentrated fruit juice, 160 parts by volume of the solution containing citric acid to 50%, 35,000 parts by weight of sugar, 20 parts by weight of orange-essence, 3 parts by weight of ascorbic acid and 27,000 parts by volume of water.

*Example 5*

To the mixture containing 50 parts by weight of tetrahydroabietic acid ethyl ester and 10 parts by weight of orange oil are added 1 part by weight of $\beta$-carotene, 0.1 part by weight of BHT and 0.01 part by weight of BHA, while heating at about 100° C. for about 30 minutes.

After cooling, the resultant mixture is admixed with an aqueous solution of 10 parts by weight of gum arabic and 10 parts by weight of sodium ascorbate in 100 parts by volume of water.

The entire resultant solution is homogenized at the rate of 4000 lb./in.² To the so-obtained emulsion are added 50 parts by weight of a drying agent consisting of dextrin, lactose, powdery millet jelly. The resultant mixture is spray-dried to obtain a powdered product of β-carotene.

*Example 6*

A stable powdery orange juice containing no artificial pigment is prepared by incorporating 3 parts by weight of powder obtained by Example 5 into 500 parts by weight of powdery orange juice (spray-dried or vacuum-dried), 1000 parts by weight of crystallized glucose, 35 parts by weight of citric acid, 40 parts by weight of sodium cyclohexylsulfamate, 4 parts by weight of sodium chloride, 20 parts by weight of powdery perfume and 20 parts by weight of ascorbic acid.

Having thus disclosed the invention, what is claimed is:

1. A method for preparing a stable and safely utilizable coloring agent containing carotenoid pigment which comprises dissolving carotenoid pigment in a solvent selected from the group consisting of abietic acid, hydrogenated abietic acid and a lower aliphatic alcohol ester thereof, while heating to a temperature of from 90 to 140° C.

2. A method for preparing a stable and safely utilizable coloring agent containing carotenoid pigment which comprises dissolving carotenoid pigment in a solvent selected from the group consisting of abietic acid, hydrogenated abietic acid and a lower aliphatic alcohol ester thereof, while heating within 60 minutes at about 90° C. to 140° C.

3. A method for preparing a stable and safely utilizable coloring agent containing carotenoid pigment which comprises dissolving carotenoid pigment in a solvent selected from the group consisting of abietic acid, hydrogenated abietic acid and a lower aliphatic alcohol ester thereof, while heating to a temperature of from 90 to 140° C., and adding an essential oil to the resultant solution for the purpose of controlling the specific gravity.

4. A method for preparing a stable and safely utilizable coloring agent containing carotenoid pigment which comprises dissolving carotenoid pigment in a solvent selected from the group consisting of abietic acid, hydrogenated abietic acid and a lower aliphatic alcohol ester thereof, while heating to a temperature of from 90 to 140° C., and suspending thus prepared solution in water with the aid of a dispersing agent.

5. A method for preparing a stable and safely utilizable coloring agent containing carotenoid pigment which comprises dissolving carotenoid pigment in a solvent selected from the group consisting of abietic acid, hydrogenated abietic acid and a lower aliphatic alcohol ester thereof, while heating to a temperature of from 90 to 140° C., and emulsifying the solution of carotenoid pigment in water with the aid of an emulsifying agent.

6. A method for preparing a stable and safely utilizable coloring agent containing carotenoid pigment which comprises dissolving carotenoid pigment in a solvent selected from the group consisting of abietic acid, hydrogenated abietic acid, and a lower aliphatic alcohol ester thereof, while heating to a temperature of from 90 to 140° C., suspending the resultant solution of carotenoid pigment in water with the aid of a dispersing agent, and converting the resultant suspension to a powdery state by spray-drying thereof.

7. A method for preparing a stable and safely utilizable coloring agent containing carotenoid pigment which comprises dissolving carotenoid pigment in a solvent selected from the group consisting of abietic acid, hydrogenated abietic acid, and a lower aliphatic alcohol ester thereof while heating to a temperature of from 90 to 140° C., emulsifying the resultant solution of carotenoid pigment in water with the aid of an emulsifying agent and converting the resultant emulsion to a powdery state by spray-drying thereof.

8. A powdery coloring agent consisting essentially of carotenoid pigment, the solvent selected from the group consisting of abietic acid, hydrogenated abietic acid and a lower aliphatic alcohol ester thereof and dispersing agent.

9. A stable and safely utilizable aqueous dispersion of a coloring agent consisting essentially of a solution of carotenoid pigment in a solvent selected from the group consisting of abietic acid, hydrogenated abietic acid and a lower aliphatic alcohol ester thereof.

10. A stable and safely utilizable aqueous dispersion of a coloring agent consisting of a solution of carotenoid pigment in a solvent selected from the group consisting of abietic acid, hydrogenated abietic acid and a lower aliphatic alcohol ester thereof, and of an essential oil.

11. A stable aqueous emulsion of a coloring agent consisting essentially of a solution of carotenoid pigment in a solvent selected from the group consisting of abietic acid, hydrogenated abietic acid and a lower aliphatic alcohol ester thereof.

12. A stable and safely utilizable coloring agent consisting essentially of a solution of carotenoid pigment in a solvent selected from the group consisting of abietic acid, hydrogenated abietic acid and a lower aliphatic alcohol ester thereof.

References Cited by the Examiner
UNITED STATES PATENTS
2,874,058   2/1959   Klaui et al. _____ 99—148

A. LOUIS MONACELL, *Primary Examiner.*